INTERFERENCE ATTENUATING POWER CONDUCTOR UTILIZING INTENSIFIED SKIN EFFECT TO ATTENUATE HIGH FREQUENCIES

Filed May 3, 1963

DON B. CLARK,
INVENTOR.

By W Glenn Jones
ATTORNEY.

United States Patent Office 3,219,951
Patented Nov. 23, 1965

3,219,951

INTERFERENCE ATTENUATING POWER CONDUCTOR UTILIZING INTENSIFIED SKIN EFFECT TO ATTENUATE HIGH FREQUENCIES

Don B. Clark, Ventura, Calif., assignor to the United States of America as represented by the Secretary of the Navy Filed May 3, 1963, Ser. No. 277,960
2 Claims. (Cl. 333—79)
(Granted under Title 35, U.S. Code (1952), sec. 266)

The invention described herein may be manufactured and used by or for the Government of the United States of America for governmental purposes without the payment of any royalties thereon or therefor.

This invention relates to means for eliminating radio interference energies from being transmitted on electrical power conductors possible carrying large currents into a zone of use where such radio or high frequency interference effects cannot be tolerated.

Power transmission lines are necessary connections between the power generator or source and the location of the operating equipment of the user. Some of these transmission lines may be many miles in length. In addition to the power supplied to these lines at the generating source at a fairly undistorted fundamental power frequency, these transmission lines may deliver a broad spectrum of undesirable radio interference frequencies with random phase and energy distribution. Possible sources of this unwanted interference include faulty or poorly maintained transmission line components, feedback from noisy loads, atmospheric, stray or induced radio communication frequencies and other radiated energies absorbed and guided by the transmission lines.

The reduction of such spurious and undesired interferences from power transmission line to a tolerable level at a sensitive area has been accomplished in the past by intricately designed isolation measures. Such isolation measures comprise passive filter components inserted in the lines, burying of lines, and constructional shielding methods to surround the apparatus in the sensitive area. By utilizing combinations of presently known techniques, specific areas can be isolated from particular unwanted radio-interference frequency bands found on such power transmission lines. Present methods, however, require a separate analysis of each radio-interference situation and considerable time and money may be expended before sufficient measures have been taken to protect sensitive areas. The practical and economical solution to this pressing problem of reduction of non-power distribution frequencies to a tolerable level has been found in the improved design of the transmission line per se.

Wave propagation along a transmission line with its distributed inductance and capacitance to ground with either ground or wire return is in the form of a principal wave. Higher order modes are attenuated in short distances. Thus, attenuation of the principal wave at frequencies above 50 megacycles has been found sufficient to result in negligible energies in the measurements of the fields around normal transmission lines. The use of passive filters composed of lumped inductance and capacitance to block or bypass unwanted random frequencies from transmission lines results in high standing wave ratios, reflection, and radiation of the undesired spurious energies, except in possible narrow frequency bands where filter impedance may be designed to match those of the lines.

It was early recognized that a possible and practical approach to this problem was related to the phenomenon of "skin effect." It has long been known that electrical conductors carrying alternating current exhibit the property that the current concentrates around the outer portion of the conductor. This increases the current density near the surface and leaves the inner portion of the conductor to act merely as a physical support which takes little part in the current carrying capacity. This phenomenon is attributed to the fact that the flux generated by the current also generates a counter-electromotive force in the conductor which is greater in the center thereof than on the adjacent surface. The current concentration near the outer surface of the conductor increases its effective resistance to the flow of alternating current. This increase is comparatively small for currents of the usual power frequencies, termed low frequencies, but becomes quite pronounced at higher or radio frequencies. Any further phenomena which could be utilized to artifically enhance or abnormally enlarge the current concentration of and hence the effective resistance to such unwanted higher frequencies in the outer surface of a conductor would be a solution to the elimination or reduction of such undesired spurious effects.

The principal object of this invention, therefore, is to provide a simple and effective means for the reduction and possible elimination of non-power distribution frequencies from power transmission lines conducting high current, high voltage, low frequency electrical power to sensitive areas.

A further object of this invention is to provide an economical method of radio-interference elimination from power transmission lines which is universal in its application, thus obviating the necessity of designing isolation equipment for specific frequencies or groups of frequencies.

Another object of this invention is to augment and enhance the natural phenomenon of "skin effect" in alternating current transmission lines whereby undesired spurious higher frequencies conducted or radiated by such transmission lines may be dissipated as a Joulean heat loss.

Other objects and advantages will be apparent from the following detailed description of the invention, pointed out in particularity by the appended claims, and taken in connection with the accompanying drawings, in which:

Figures 1, 2, 3, 4, 5, 6:
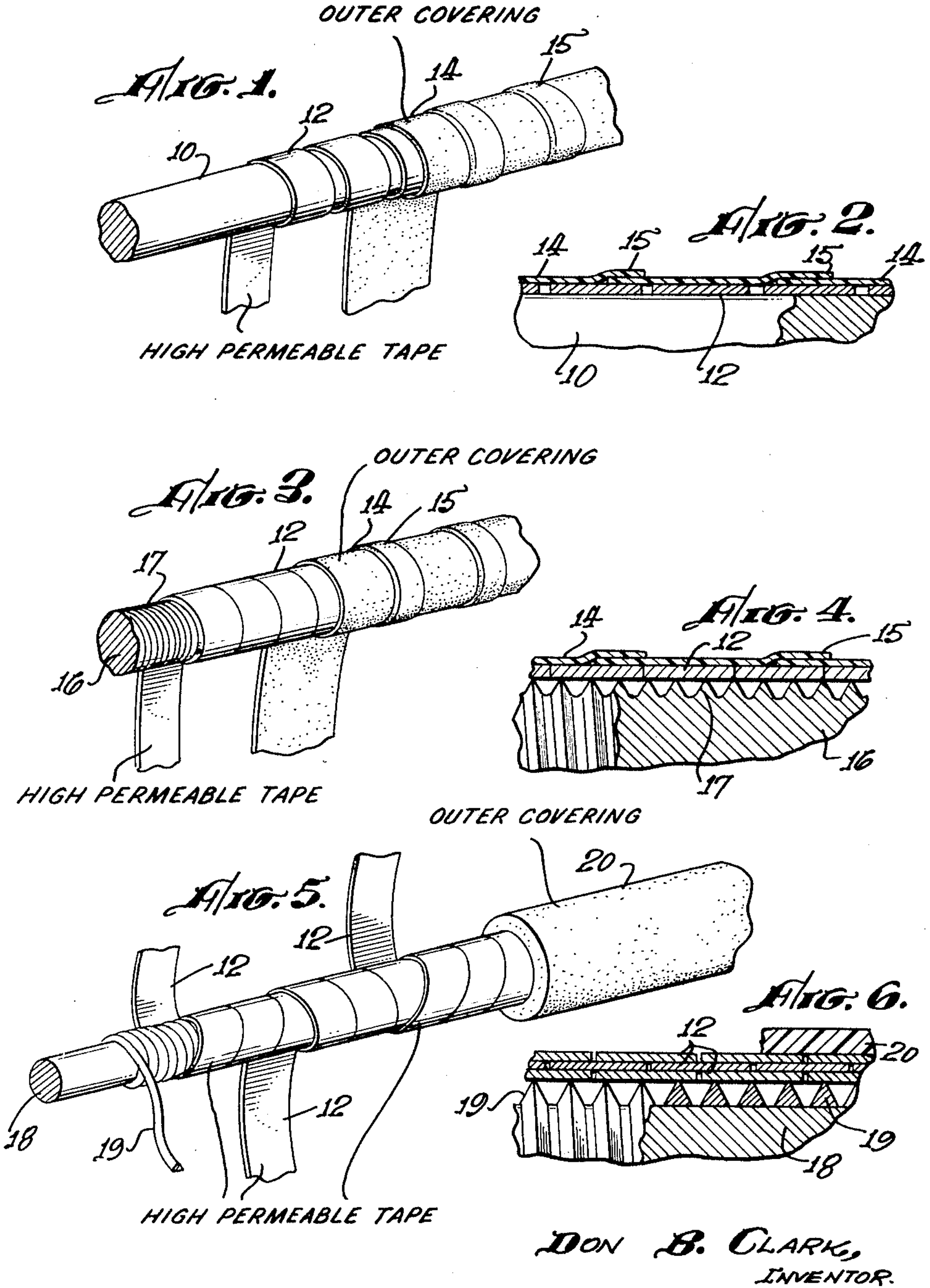
FIGURE 1 is a perspective view of one form of the invention.
FIG. 2 is a part cross-sectional elevation showing details of construction of the cable form shown in FIG. 1.
FIG. 3 is a perspective view of another form of the invention.
FIG. 4 is a part cross-sectional elevation showing details of construction of the cable form shown in FIG. 3.
FIG. 5 is a perspective view of still another form of the invention.
FIG. 6 is a part cross-sectional elevation showing details of construction of the cable form in FIG. 5.

As noted above, the A.C. resistance or "skin effect" is the tendency for current to flow in the outer sections of a cylindrical cable or conductor which sections become thinner as frequency is increased. Since, as it also has been stated that this effect is primarily due to the electromagnetic interrelationships occasioned by the periodic variations in current values and the corresponding fluctuations of magnetic intensity, it can be shown mathematically and experimentally that the current density or concentration $i$ increases with the radius $r$ of the conductor and this increase is directly proportional to the permeability $\mu$ and the time rate of change or oscillation of the induced magnetic field H. Thus, by surrounding the conductor with a close, tightly wound layer of low-conductivity, high-permeability material in firm electrical contact therewith, it has ben found that the A.C. resistance to higher frequency components has been greatly enhanced, resulting in rapid attenuation and practically complete elimination of the nonpower distributed higher frequencies conducted or radiated by the power transmission lines.

A practical high permeability material was readily found as a commercially produced SiFe magnetic tape. Thus, with reference to FIGS. 1 and 2, the bare cable or conductor 10 which may be of solid wire as shown or of a bundle of standard wires is first wrapped with a layer 12 of the above mentioned magnetic tape. In this first form of the invention, the tape 12 was wound with a small helical gap separating adjacent turns. Preliminary calculations indicated that, with a large current at ordinary power frequencies, there would be a large magnetizing force around the conductor which would tend to saturate the layer of high permeability material which would not only reduce its effectiveness in enhancing the skin resistance but might offer appreciable hysteresis losses at the lower power frequency. Experimental proof soon followed showing that the presence of the low conductivity, high permeability material greatly magnified the effective skin resistance by increasing the number of magnetic flux lines in the outer layers of the conductor which increase in magnetic intensity served to force the high frequency currents to the outer portions of the conductor and into the tape itself which, because of its low conductivity, contributed to the over-all increase in skin resistance to and attenuation of the spurious radio-interference frequencies.

As further shown in FIGS. 1 and 2, the layer of magnetic tape 12 is then followed by one or more layers 14 of insulating material. This latter may be laid on as tape with overlying segments or edges 15 or as a continuous extruded covering.

With further experimentation and field testing, it was found that the saturation effects of the high currents at low frequencies in the high permeability tape were not nearly as great as had been feared, hence, as shown in FIGS. 3 to 6, inclusive, the magnetic tape 12 may be wound with contiguous convolutions. Fortunately, this mode of construction is considerably more economical with greater ease of application than where the helical gap is provided. However, the attenuation of the unwanted higher frequencies was not effected as completely or as rapidly as desired and effective means were sought to further enhance the skin effect. This was accomplished, as shown in FIGS. 3 and 4, by providing the conductor 10 with a helical thread 17 over which the magnetic tape is wound in contiguous turns. As before, the magnetic tape assists in forcing the high frequency currents to the outer surfaces of the conductor while the helical thread forces the currents to follow a much longer path of reduced volume which, in itself, greatly increases the skin or loss resistance and enhances the Joulean effect. A layer of insulating material 14 may be provided as described above.

While the embodiment of the invention as shown in FIGS. 3 and 4 was found to be eminently satisfactory, it is obvious that the type of construction there shown is practically restricted to solid conductors. While such solid conductors may be considered suitable in the smaller sizes, large transmission cables are best constructed of stranded wires for greater facility in manufacturing, storing, shipping, and laying or erecting. Without sheathing the stranded cable with lead or other metal coverings, which would not be desirable either electrically or economically, the cutting of a helical thread in the surface thereof would be well-nigh impossible to attain. As shown in FIGS. 5 and 6, this difficulty was successfully overcome by wrapping the stranded cable 18 with a first continuous wrap of triangular shaped conducting wire 19.

This provided the helically threaded path of reduced volume for the high frequency currents. One or more layers of magnetic tape 12 are then wound over the triangular wire wrap 19 followed by the insulating material covering 14. Where two or more wraps or layers of magnetic tape are provided, it will be noted that adjacent layers are applied of opposite hands or directions so that a more continuous coverage may be provided. It will also be noted that while cable 18 has been described as being of a stranded nature, the use of a solid conductor is not precluded.

In further definition of the term "sensitive area" used above, such areas, having generally low-intensity electromagnetic environments, are separated by considerable distances from population centers or industrial activities. Such locations are chosen for the location of very sensitive electronic systems such as radio telescopes, radars, communication monitoring systems, satellite and missile tracking systems, to mention a few, which systems are extremely vulnerable to electromagnetic interference. Necessary power for these installations must be transmitted from generators located at comparatively great distances. The transmission systems heretofore supplied for conducting power to these installations are susceptible and available to absorb electromagnetic interference energies and to convey them, generally, with low attenuation into these sensitive areas where they can become a critical problem in interference.

Having thus described several embodiments of my invention, I claim:

1. An electric power transmitting cable for delivering electric power to electronic installations sensitive to spurious electromagnetic interference frequencies inadvertently absorbed and transmitted by said cable comprising:

a central core of high conductivity low permeability material, said central core being formed with a helical thread in its outer surface;

a layer of low conductivity high permeability ferromagnetic material surrounding said central core and in electrical contact with the outer portions of said helical thread; and an outer covering of insulating material surrounding said layer of ferromagnetic material.

2. An electric power transmitting cable for delivering electric power to electronic installations sensitive to spurious electromagnetic interference frequencies inadvertently absorbed and conducted by said cable comprising:

a central core of high conductivity, low permeability material;

a helical wrap of triangular shaped wire of high conductivity, low permeability material laid on said central core and in electrical contact therewith;

a layer of low conductivity, high permeability ferromagnetic material surrounding said central core and said wrap of triangular shaped wire, said ferromagnetic material being in electrical contact with the outer portions of said wire; and a covering of insulating material surrounding said layer of ferromagnetic material.

References Cited by the Examiner

UNITED STATES PATENTS

| | | | |
|---|---|---|---|
| 1,586,862 | 6/1926 | Ten Eyck | 178—45 |
| 1,586,884 | 6/1926 | Elmen | 174—36 |
| 1,899,501 | 2/1933 | Gabriel | 178—45 |
| 1,984,526 | 12/1934 | Given | 333—79 |

HERMAN KARL SAALBACH, *Primary Examiner.*